Oct. 14, 1958  A. GURSCH  2,855,734
METHOD OF CENTERING AND GRINDING EDGES OF OPTICAL LENSES
Filed April 23, 1956
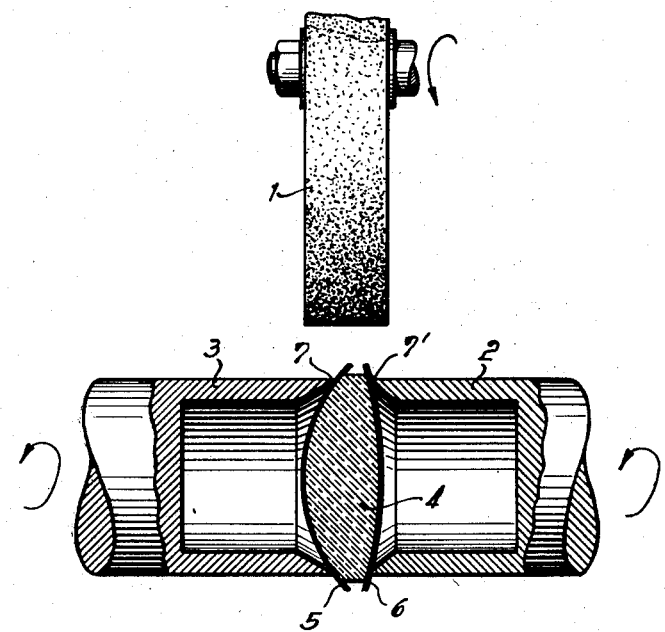
INVENTOR
ALFRED GURSCH
BY R.D R⟶
ATT'Y

United States Patent Office 2,855,734
Patented Oct. 14, 1958

2,855,734

METHOD OF CENTERING AND GRINDING EDGES OF OPTICAL LENSES

Alfred Gursch, Berlin-Steglitz, Germany, assignor to Askania-Werke A. G., Berlin-Friedenau, Germany, a corporation of Germany Application April 23, 1956, Serial No. 580,084

Claims priority, application Germany April 23, 1955

2 Claims. (Cl. 51—284)

This invention relates to a method of centering and grinding edges of optical lenses; the new method being characterized in that it provides safe self-centering of the lenses, followed by strong holding thereof during the grinding operation.

Heretofore, difficulties have been encountered in the use of edge-grinding apparatus of the self-centering type; lens surfaces were marked or marred by impressions of the edges of lens holding cups. It is an object of considerable importance for the lens-grinding art to avoid such difficulties; and the object has been achieved by the present invention. According to the invention there is interposed between the cup and the lens surface a very thin intermediate layer of homogeneous material, having a high degree of uniformity as to thickness, the material being able to resist the physico-chemical load imposed thereon. More precise details of the invention will be understood from the description of a preferred embodiment, which follows.

The drawing is a diagrammatic, axial section of structure desirably employed in performing the new method, in operative position, also showing cooperating portions of the lens grinding machine.

A grinding wheel 1 is arranged adjacent the working zone between a pair of lens holder cups 2 and 3 of the edge-holding type. Between each cup and the lens 4 held thereby there is interposed a thin foil 5, 6 of a form substantially as shown, except that the drawing necessarily exaggerates the thickness of the foil membrane. Thus the front edges 7, 7' of the cups contact, directly, only these foil membranes.

It will be understood that the form of the lens 4, shown in the drawing, can be modified widely; and the forms of the membranes in surface contact therewith can be modified correspondingly. Likewise considerable variation is possible as to materials; but it may be noted that the invention is particularly beneficial in connection with the grinding of lenses consisting of relatively soft glass, or of certain plastics, wherein the edges 7, 7' tend to leave deep and bothersome impressions. The membranes themselves can be made of various materials, by different processes; particularly from different synthetic resins fabricated in form of films as shown. Such films desirably have a thickness of a few hundredths of a millimeter, that is, about one-thousandth of an inch, with a uniformity which as mentioned should be very high, allowing tolerances only of small fractions of such thickness. As further mentioned above, the films should be very homogeneous. A material which has been found suitable is that known as "supronyl;" other examples are cellulose acetate, polyethylene, cellophane etc.

The operation of the centering and holding cups 2, 3 may be considered as one form of a new self-centering and edge grinding process for lenses. During the grinding, high axial pressures are applied to the lens 4, it being necessary to hold the lens entirely without the aid of putty and cement and yet to hold it firmly against the lateral pressure of the grinding wheel 1. Heretofore the high axial pressure employed has frequently caused the formation of impressions of cup edges 7, 7' on polished lens surfaces, mainly when soft lens materials were used. Even prior to the application of grinding pressure, at the very start of the centering operation, such impressions or other marrings were sometimes formed, incident to the movement of the lens positioning itself between the cups. If such impressions are shallow they can sometimes be removed by the finishing process; this is expensive but at least it avoids complete loss of the lens. Often, however, the impressions heretofore formed were so deep that they could be removed only by renewed surface grinding; and this is usually prohibitive at least for the fabrication of lenses having high or intermediate accuracy—the lenses are made too thin and the coincidence of optical and mechanical axes is destroyed. All these difficulties are avoided by the simple device consisting of the pair of foils shown at 5, 6.

It is only necessary for this tool or device that it should possess the dimensional and physical characteristics indicated above, in order that the lenses may center themselves properly and may then be held firmly. Mechanically, the foils must resist the axial pressure applied by the cups. Chemically they must resist, particularly, the attack of the cooling fluid used during the grinding process, which may be gasoline, oil, water or the like. Furthermore it is desirable that the foils 5, 6 should have very smooth surfaces and should be pliably formed so that they have good surface contact, without any fold-forming tendency, even on strongly bulging lens surfaces having short radii of curvature. These features are important particularly in connection with the self-centering of the lenses between the cups.

I claim:

1. In a method of centering and edge grinding an optical lens, the steps of slidably interposing the lens between a pair of thin synthetic plastic foils of highly uniform thickness, each foil having one aside conforming to and contacting one side of the lens; slidably interposing the two foils, with the lens therebetween, between two rotatable cups; rotating the cups and thereby the lens while applying slight pressure therebetween to allow the lens to slide relative to the cups, for self-centering of the lens without direct contact thereof with the cups; and then rotating the cups and thereby the lens while applying stronger pressure therebetween to prevent the lens from sliding relative to the cups, and grinding the edge of the lens while held under said stronger pressure.

2. A method as described by claim 1, further characterized by applying said slight and stronger pressures in limited zones of edgewise contact between the cups and the foils.

References Cited in the file of this patent

UNITED STATES PATENTS

| 1,184,496 | Stenvall | May 23, 1916 |
| 1,389,912 | Stead | Sept. 6, 1921 |
| 2,573,668 | Long et al. | Oct. 31, 1951 |

FOREIGN PATENTS

| 541,920 | Great Britain | Dec. 17, 1941 |